Figure 1:
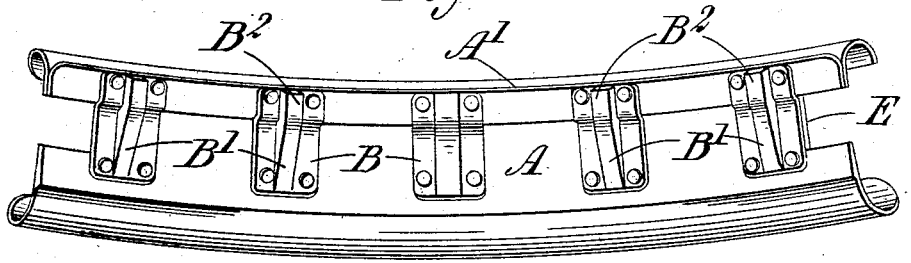

J. W. HALL & C. BAYNES.
DETACHABLE RIM FOR RESILIENT TIRES.
APPLICATION FILED APR. 2, 1912.

1,142,563.

Patented June 8, 1915.

3 SHEETS—SHEET 1.

Witnesses

Inventors
J. W. Hall,
Cyril Baynes,

J. W. HALL & C. BAYNES.
DETACHABLE RIM FOR RESILIENT TIRES.
APPLICATION FILED APR. 2, 1912.
1,142,563.
Patented June 8, 1915.
3 SHEETS—SHEET 2.
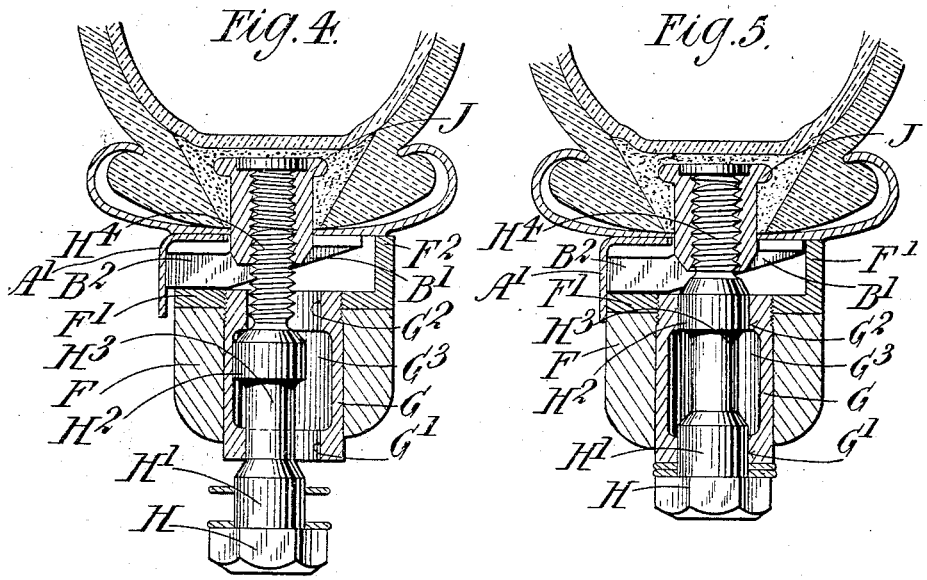
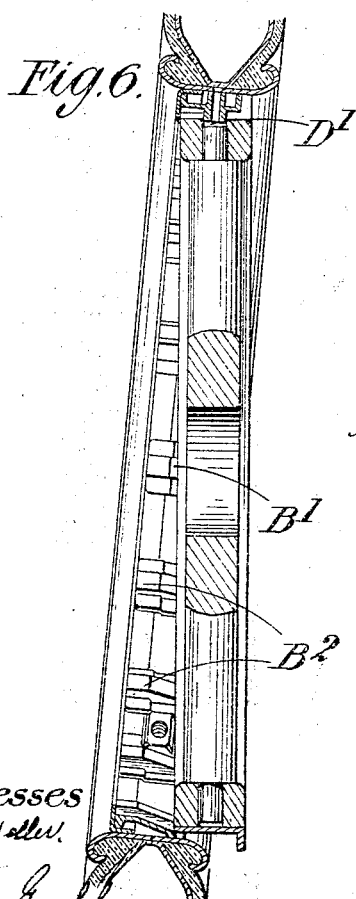
Witnesses
Inventors
J. W. Hall.
Cyril Baynes,
by Bakewell, Byrnes & Parmelee,
Attys J. W. HALL & C. BAYNES.
DETACHABLE RIM FOR RESILIENT TIRES.
APPLICATION FILED APR. 2, 1912.
1,142,563.
Patented June 8, 1915.
3 SHEETS—SHEET 3.
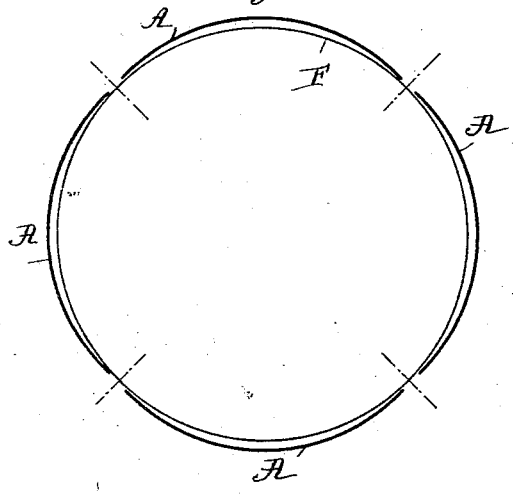
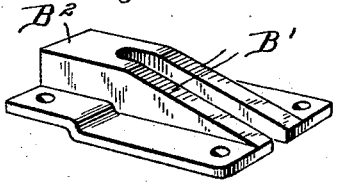
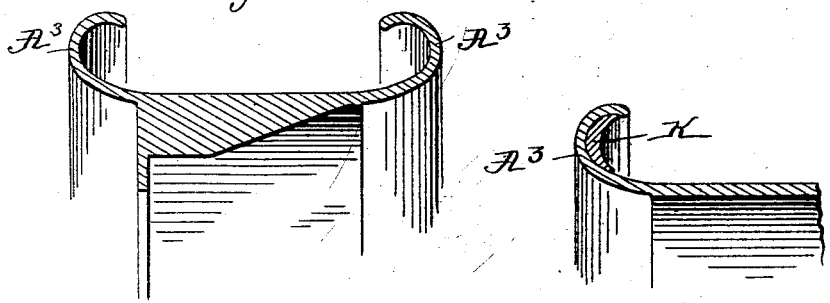
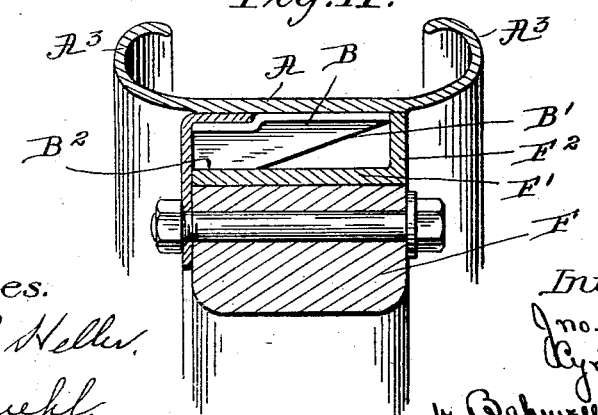
Witnesses.
Jesse B. Heller
Leo W. Guehl
Inventors.
Jno. W. Hall
Cyril Baynes
by Bakewell, Byrnes Parmelee
Attys.

UNITED STATES PATENT OFFICE.

JOHN WILLIAM HALL AND CYRIL BAYNES, OF LONDON, ENGLAND.

DETACHABLE RIM FOR RESILIENT TIRES.

1,142,563.　　　　　Specification of Letters Patent.　　　Patented June 8, 1915.

Application filed April 2, 1912. Serial No. 687,975.

*To all whom it may concern:*

Be it known that we, JOHN WILLIAM HALL and CYRIL BAYNES, subjects of the King of England, both residing in London, England, have invented certain new and useful Improvements in Detachable Rims for Resilient Tires, of which the following is a specification.

This invention relates to improvements in detachable rims for resilient tires and has for its object to enable the rim and tire, when the latter is either fully inflated or otherwise, to be rapidly placed in position on the wheel and secured thereto.

According to this invention, there is provided for each vehicle wheel a detachable rim comprising a plurality of independent separable rim segments which are adapted to hold a tire and whose effective internal perimeter measured, when the parts are assembled in a plane normal to the wheel axis, is less than the perimeter of the rim-seating portion of the wheel in that plane and coöperating wedging surfaces on the rim-segments and on the wheel, said coöperating wedging surfaces having relative inclination in a direction transverse to the plane of the wheel.

The words "effective internal perimeter", occurring in connection with the rim, are intended to include only the sum of the lengths of the rim-segments; or where the rim-segments are provided with inclined wedging surfaces or wedge-shaped feet, the "effective internal perimeter" is the sum of the lengths of imaginary lines subtending the rim-segments and joining the contact surfaces of the seating surfaces or feet. In other words, the "effective internal perimeter" of the rim is the internal circumference minus any gaps which may occur between the rim-segments, or a corresponding measurement at the seating surfaces engaging the rim-seating portion on the wheel.

The relatively inclined bearing surfaces enable the rim, as a whole, to be expanded to the diameter of the rim-seating portion on the wheel or bonding band, and so, by pressure of the inflated tire, to assume a close fit to the wheel. The enlargement of the rim may also expand the tire in cases where it also, when off the wheel, is normally smaller in perimeter than the wheel. Preferably, the coacting surfaces on the rim are in the form of separated inclined wedging-surfaces or wedge-shaped feet.

In a construction having the features above described, the rim is preferably capable of being hooked or otherwise similarly secured to the wheel at one point, so that the remainder of the rim may be swung about that point as a fulcrum to apply it to the wheel, and during such application to expand the rim in the manner above referred to.

The term "rim-seating portion of the wheel" refers in the particular construction illustrated to the felly band on the periphery of the wheel, upon which the detachable rim is seated when in place.

Other features of the present invention will be more clearly understood from the following description taken in connection with the accompanying drawings, which show a preferred method of carrying the invention into effect and in which:—

Figure 2:
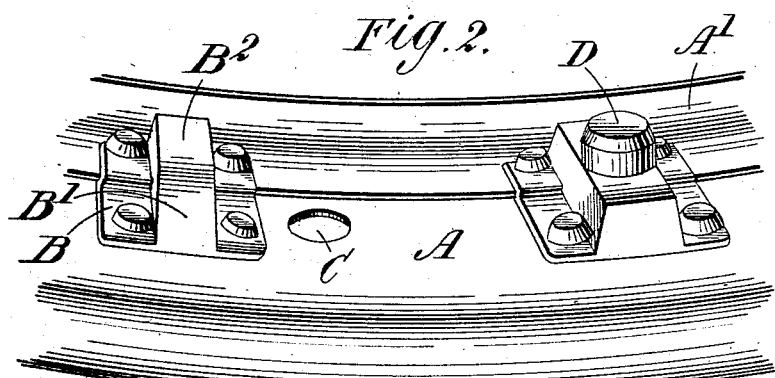
Figure 3:
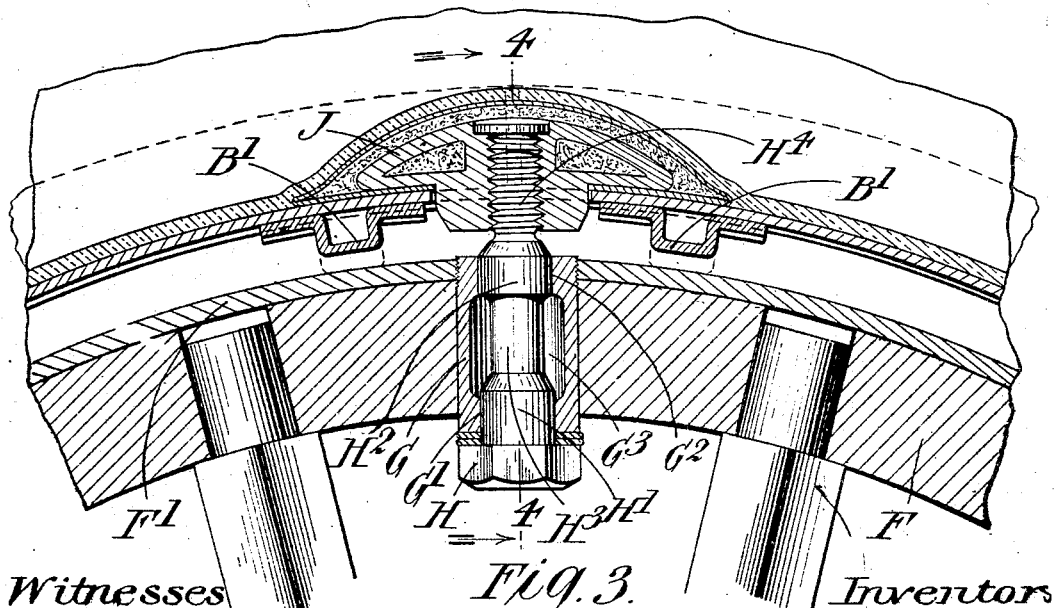

Figure 1 shows a segment of the rim; Fig. 2 shows a segment of the rim provided with a hole for the valve-stem on an enlarged scale; Fig. 3 a section through the plane of the wheel at the division of the rim; Fig. 4 is a section on the line 4—4, looking in the direction of the arrows, of Fig. 3 showing the rim partly applied to the wheel; Fig. 5 is a similar view to Fig. 4 showing the rim completely applied to the wheel; Fig. 6 diagrammatically illustrates the method employed for applying the rim to the wheel, Fig. 7 is a diagram illustrating certain features in the formation of the rim-segments; Fig. 8 is a view similar to Fig. 7, showing a modified form of segments; Fig. 9 is a perspective view of a modified form of foot for the rim segments; Fig. 10 is a transverse sectional view through a modified form of rim segment; Fig. 11 is a transverse sectional view through another modified form of rim segment and foot attached thereto; and Fig. 12 is a sectional view of another modified form of rim segment.

Like letters indicate like parts throughout the drawings.

In the particular construction illustrated the rim is divided into four segments such as A, although it may be cut into a larger or smaller number of segments as found convenient. Each segment has secured to it a flange $A^1$ projecting inwardly at right-angles from its underside and to one edge thereof the flanges forming, when the rim-segments are assembled on the wheel, a substantially circular flange. Each rim-segment is provided with feet or supports B, there being preferably five of such feet to each rim-segment. The feet are cast or stamped as illustrated in the drawings and each of them has a wedge-surface $B^1$ and a portion $B^2$ which is approximately parallel to the transverse surface of the rim-segment. The feet are riveted or otherwise secured to the underside of the rim-segment so that the portion $B^2$ of each foot is close to the flange $A^1$. The tapered end of the portion $B^1$ and the extremity of the foot near that portion terminates a little short of the edge of the rim-segment.

As shown in Fig. 2 that segment in which there is a hole C provided to accommodate the valve-spindle from the inner tube of the tire has also a projection such as D secured as shown in the drawings which may act as a driving stop and a locating stop to locate the rim in its correct position on the wheel and to act as a fulcrum point when the rim and tire together are swung on to the wheel in the manner to be more particularly described hereinafter. The end of each rim-segment is slotted as at E to receive a portion of the boss of a security-pad which is placed at the junction of each pair of segments.

Referring to Figs. 3, 4 and 5, it will be seen that the wheel is of ordinary construction and although it is shown as having a solid felly, the latter may be equally well of a hollow formation. The felly F is surrounded by a bonding band $F^1$ having an outwardly projecting flange $F^2$ extending completely around one edge of the bonding band. At intervals around the felly are radial slots, each of which is provided with a sleeve G constructed as shown in the drawings to have two restricted cylindrical portions $G^1$ and $G^2$ and an enlarged portion $G^3$ connecting them. The holes in the felly are so disposed that when the rim is in its correct position on the wheel the joints of the rim-segments will come just over the holes so that a security-pad located at the junction of the meeting ends of two rim-segments may be readily engaged by a security-bolt passing through the hole. The security-bolt H itself has two cylindrical portions $H^1$ and $H^2$ adapted to fit in the portions $G^1$ and $G^2$ respectively of the sleeve G and it also has a restricted portion $H^3$ between the portions $H^1$ and $H^2$. Further, a projecting portion $H^4$ is provided with a screw-thread adapted to engage with a similarly threaded portion in the security-pad. The security-pad itself is of usual construction and has a boss J having a screw-threaded portion to receive the screwed projection $H^4$ from the security-bolt.

To apply the rim and the tire to the wheel the rim-segments are first applied to the tire, security-pads having been previously inserted at the junction of the rim-segments. The last rim-segment may be applied if necessary with any convenient form of lever and when all the rim-segments are in place the effective internal perimeter of the rim as a whole will be less than the outer perimeter of the wheel. That is to say, when the segments abut at their meeting ends, the perimeter of an imaginary line parallel to the rim and passing through the points of contact of the bearing surface $B^2$ will be less than the perimeter of the bonding band $F^1$; or the inner perimeter of the rim when the sections abut will be less than the outer perimeter of the flange $F^2$ of the bonding band $F^1$. The valve-stem from the tire projecting through the hole C in the rim is passed through a radial hole or slot provided in the felly for its reception and the projection or stop D is also inserted in a hole $D^1$ provided in the bonding band $F^1$ as shown in Fig. 6. When this has been done the rim and tire will be in the position shown in that figure relatively to the wheel and the other portion of the rim may then be forced on to the rim seating portion of the wheel either by hand-pressure or by means of a cramp and during the application, the wedge-surfaces $B^1$ engaging with the edge of the bonding band $F^1$ cause the rim-segments to part and the rim and tire as a whole to be expanded. When the rim is in place the front beveled edges of the feet B will preferably abut against the inner edge of the flange $F^2$, the free portion of the rim extended beyond the feet, resting on the top of the flange, and the flange $A^1$ of the rim-segments will engage with the opposite side of the felly. The security-pads will then be in positions approximately over the holes in the sleeves G and by the construction of the sleeves and the security-bolts H the projection $H^4$ of the latter may be moved about until it engages the screw-socket in the boss J. Fig. 4 shows a case in which the rim has not been fully pressed home on to the felly of the wheel but owing to its movement the security-bolt has been enabled to engage the screw-socket of the boss J. By screwing the security-bolt completely home it will assume the position shown in Figs. 3 and 5, and in addition to holding the rim-segments in place it acts as a centering means to draw the rim into its proper position on the wheel for as will be seen in Fig. 4 sloping surfaces surmounting the cylindrical portions $H^1$ and $H^2$ engage with the edges of the cylindrical recesses $G^1$ and $G^2$ and allow the bolt to slide completely home and to draw the security-pads, and with them the rim-segments, into their correct positions.

It is preferable to construct the rim-segments so that they have not normally the same curvature as that of the seating portion on the wheel. In the diagram, Fig. 7, it will be seen that the ends of the rim-segments in the lower portion of the wheel do not engage the periphery of the wheel until they are screwed home, while in the upper portion of Fig. 7 the ends of the rim-segments have been shown as drawn home by the security-bolts when they will lie closely around the periphery of the wheel and form a good grip. Obviously each segment could be made with a curvature struck from a radius smaller than that of the wheel as shown in Fig. 8, in which case means would be provided for drawing the middle portion of each rim-segment down to the seating portion on the wheel.

Many modifications may be made in carrying the invention into effect, for example, the inclined portions of some or all of the feet B in each section may be slotted from their apices so that they may engage corresponding pins on the periphery of the wheel so as to guide each section into its allotted position as shown in Fig. 9.

Another construction may provide that the form of seating portions differs from that already described. No limitation is imposed upon the construction of felly or seating portion employed although preferably it shall provide surfaces to co-act with those producing the wedging action on the rim-segments and also other surfaces acting as bearing surfaces for the rim-segments when they are in position. Consequently, the rim may be coned in the middle portion in a transverse direction the two edges being, however, cylindrical as shown in Fig. 10 or in any other desired manner.

Security-pads and bolts as described may be replaced by security-pads fixed inside the tire at the junction of the rim-segments, the latter being secured to the wheel by bolting through the depending flange or by any convenient holding means.

With rims divided transversely in the manner described herein it is advisable to provide means for preventing the passage of dirt, water or other foreign matter into the space between the bead of the tire and the rim. To effect this, inside the bead of the rim-section at each end a plate K, (as shown in Fig. 12) may be secured as by riveting or sweating and is so shaped that it is thicker at the middle of its cross-section than at the edges. Thus when a tire is in position these plates will embed themselves in the tire and thus close the entry of the space in which the foreign matter will otherwise accumulate.

Other modifications may be made in details in carrying the invention into effect provided always that the spirit of the invention is not departed from.

What we claim as our invention and desire to secure by Letters Patent is:

1. In a detachable rim for a vehicle wheel, the combination of a plurality of independent separable rim-segments which are adapted to hold a tire and whose effective perimeter measured, when the parts are assembled, in a plane normal to the wheel-axis is less than the external perimeter of the rim seating portion on the wheel in that plane, and coöperating wedging surfaces on the rim-segments and on the wheel, said coöperating surfaces having relative inclination in a direction transverse to the plane of the wheel.

2. In a detachable rim, the combination with a vehicle wheel, of a resilient tire, a plurality of independent separable rim-segments for holding the tire, a seating surface on each of said segments resting on a seat on the wheel, there being an inclined portion for expanding the rim-segments when applying the segments and the tire to the wheel, and radial bolts for securing the segments in position on the wheel.

3. In a detachable rim for vehicle wheels, the combination of a resilient tire, a plurality of independent separable rim-segments for holding the tire, a plurality of feet on each rim-segment, said feet having seating portions parallel with the surface on the wheel on which they are arranged to rest, angular portions extending from said seating portions adapted to spread the tire and segments when placing the tire in position on the wheel, a wheel and an annular flange extending beyond the periphery thereof arranged to form a stop for the segments and a support for one edge of the latter.

4. In a detachable rim, the combination of a plurality of independent separable rim-segments which are adapted to hold a tire and whose effective internal perimeter measured, when the parts are assembled, in a plane normal to the wheel-axis is less than the external perimeter of the rim seating portion of the wheel in that plane, coöperating wedging surfaces on the rim-segments and the wheel, said coöperative surfaces having relative inclination in a direction transverse to the plane of the wheel, and a radial projection extending outwardly from one side of the rim seating portion to support one edge of the detachable rim.

5. In a detachable rim, the combination of a plurality of independent separable rim-segments which are adapted to hold the tire and whose effective internal perimeter measured, when the parts are assembled, in a plane normal to the wheel-axis is less than the external perimeter of the rim seating portion of the wheel in that plane, a wheel, a bonding band for the wheel-felly, an outwardly extending radial flange around one side of the bonding band, and coöperating wedging surfaces on the rim-segments and on the bonding band, said coöperating surfaces being relatively inclined in a direction transverse to the plane of the wheel.

6. A combined wheel and resilient tire securing device, comprising a plurality of independent separable rim-segments for holding the tire, each of said segments having a seating portion for engaging the periphery of the wheel, there being an inclined engagement between said segments and the periphery of the wheel to expand the segments of the rim when they are applied to the wheel, radial security bolts for connecting the segments to the wheel, and an inclined portion on each of said bolts for centering the segments with relation to the wheel.

7. A combined wheel and resilient tire securing device, comprising a plurality of independent separable rim-segments for holding the tire, each of said segments having a plurality of feet having seating portions for engaging the periphery of the wheel, there being an inclined engagement between said feet and the periphery of the wheel to expand the segments of the rim when they are applied to the wheel, radial security bolts for connecting the segments to the wheel, and an inclined portion on each of said bolts for centering the segments with relation to the wheel.

8. A combined wheel and resilient tire securing device, comprising a plurality of independent separable rim-segments for holding the tire, each of said segments having a seating portion for engaging the peripery of the wheel, there being an inclined engagement between said segments and the periphery of the wheel to expand the segments of the rim when they are applied to the wheel, radial security bolts for connecting the segments to the wheel, said bolts having a restricted portion which fits loosely within a radial aperture extending through the felly of the wheel for the purpose described.

9. A combined wheel and resilient tire securing device, comprising a plurality of independent separable rim-segments for holding the tire, each of said segments having a seating portion for engaging the periphery of the wheel, there being an inclined engagement between said segments and the periphery of the wheel to expand the segments of the rim when they are applied to the wheel, radial security bolts for connecting the segments to the wheel, an inclined portion on each of said bolts, a restricted portion behind said inclined portion and adapted to fit loosely in a radial aperture extending through the felly.

10. A combined wheel and resilient tire securing device, comprising a plurality of independent separable rim-segments for holding the tire, each of said segments having a seating portion for engaging the periphery of the wheel, there being an inclined engagement between said segments and the periphery of the wheel to expand the segments of the rim when they are applied to the wheel, radial security bolts for connecting the segments to the wheel, two cylindrical enlargements on the bolts spaced from one another and connected by a restricted portion, each of said enlargements tapering toward the screw-threaded portion of the bolt, and a wheel-felly having radial apertures extending therethrough, the apertures being so dimensioned that at their ends they fit the enlarged portions of the bolt, while between the ends is an aperture larger in diameter than the end portions thereof.

11. For a vehicle wheel, the combination of a detachable rim transversely divided into a plurality of independent separable segments, each segment being so curved that in an unrestrained condition it will engage the rim seating portion of the wheel for a portion only of its length, and a bolt coacting therewith and arranged at that portion of the segment which does not engage the seating portion to force or constrain the segment into engagement with the seating portion.

12. In a detachable rim, the combination of a plurality of independent separable rim-segments which are adapted to hold a tire and whose effective internal perimeter measured, when the parts are assembled in a plane normal to the wheel-axis is less than the external perimeter of the rim seating portion of the wheel in that plane, each of the said segments being so curved that in an unrestrained condition it will engage the seating portion of the wheel for a portion only of its length, bolts coacting with the segments and arranged at that portion of the segment which does not engage the seating portion to force or constrain it into engagement therewith, and coöperating wedging surfaces on the rim-segments and on the seating portion on the wheel, said coöperating surfaces being relatively inclined in a direction transverse to the plane of the wheel.

13. For a vehicle wheel, the combination of a detachable rim transversely divided into a plurality of independent separable segments, each segment being so curved that it would engage the rim seating portion of the wheel only at or about midway of its length, and radially disposed bolts extending through the felly and engaging the segments at each of their ends to force or constrain the segments into engagement with the seating portion.

14. For a vehicle wheel the combination of a detachable rim transversely divided into a plurality of independent separable segments, each segment having on it a plurality of seating projections for engaging the periphery of the wheel and being so curved that in an unrestrained condition those projections extending from a portion only of the length of the segment will engage the periphery of the wheel, and a bolt coacting with each segment and arranged at that portion thereof where the projections do not engage the periphery to force or constrain them into engagement therewith.

15. In a detachable rim for vehicle-wheels, the combination with a resilient tire, of a plurality of independent separable rim-segments for holding the tire, a plurality of separated seating portions on each of the rim segments the perimeter of the seating portions of the rim-segments being less than the perimeter of the seats on the wheel for said portions, there being an inclined engagement between the wheel and the rim-segments for expanding the rim-segments and the tire when placing them on the wheel.

16. A detachable rim for tires for vehicle wheels, comprising a plurality of independent separable rim segments which are adapted to hold a tire and an inclined portion on each of the segments extending from a point near one edge of the segments toward the other edge thereof.

In testimony whereof we have signed our names to this specification in the presence of two subscribing witnesses.

JOHN WILLIAM HALL.
CYRIL BAYNES.

Witnesses:
RONALD S. DOLLEYMORE,
HARRY B. BRIDGE.